US009264702B2

(12) United States Patent
Liu et al.

(10) Patent No.: US 9,264,702 B2
(45) Date of Patent: Feb. 16, 2016

(54) AUTOMATIC CALIBRATION OF SCENE CAMERA FOR OPTICAL SEE-THROUGH HEAD MOUNTED DISPLAY

(71) Applicant: QUALCOMM Incorporated, San Diego, CA (US)

(72) Inventors: Kexi Liu, San Diego, CA (US); Md Sazzadur Rahman, San Diego, CA (US); Martin H. Renschler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 14/151,495

(22) Filed: Jan. 9, 2014

(65) Prior Publication Data

US 2015/0049201 A1    Feb. 19, 2015

Related U.S. Application Data

(60) Provisional application No. 61/867,551, filed on Aug. 19, 2013.

(51) Int. Cl.
*H04N 13/00* (2006.01)
*H04N 17/00* (2006.01)
(Continued)

(52) U.S. Cl.
CPC ............ *H04N 17/00* (2013.01); *G02B 27/0093* (2013.01); *G02B 27/017* (2013.01); *G06F 1/00* (2013.01); *G06T 7/0018* (2013.01); *H04L 12/1827* (2013.01); *H04N 5/7491* (2013.01); *G02B 2027/014* (2013.01); *G02B 2027/0138* (2013.01); *G02B 2027/0178* (2013.01);
(Continued)

(58) Field of Classification Search
CPC ........... H04N 13/044; H04N 13/0484; H04N 13/0051; H04N 13/0055; G02B 27/017; G02B 27/0179; G06F 3/013; G06F 3/011; G06F 3/012
See application file for complete search history.

(56) References Cited

U.S. PATENT DOCUMENTS 5,644,324 A  *  7/1997  Maguire, Jr. ..................... 345/9
6,353,436 B1 *  3/2002  Reichlen ....................... 345/427
(Continued)

OTHER PUBLICATIONS

International Search Report and Written Opinion—PCT/US2014/051220—ISA/EPO—Dec. 2, 2014.
(Continued)

*Primary Examiner* — Victor Kostak
(74) *Attorney, Agent, or Firm* — Arent Fox LLP

(57) ABSTRACT

An apparatus for calibrating an augmented reality (AR) device having an optical see-through head mounted display (HMD) obtains eye coordinates in an eye coordinate system corresponding to a location of an eye of a user of the AR device, and obtains object coordinates in a world coordinate system corresponding to a location of a real-world object in the field of view of the AR device, as captured by a scene camera having a scene camera coordinate system. The apparatus calculates screen coordinates in a screen coordinate system corresponding to a display point on the HMD, where the calculating is based on the obtained eye coordinates and the obtained object coordinates. The apparatus calculates calibration data based on the screen coordinates, the object coordinates and a transformation from the target coordinate system to the scene camera coordinate system. The apparatus then derives subsequent screen coordinates for the display of AR in relation to other real-world object points based on the calibration data.

13 Claims, 11 Drawing Sheets

(51) Int. Cl.
  *H04N 5/74*   (2006.01)
  *G06T 7/00*   (2006.01)
  *H04L 12/18*  (2006.01)
  *G02B 27/01*  (2006.01)
  *G02B 27/00*  (2006.01)
  *G06F 1/00*   (2006.01)

(52) U.S. Cl.
  CPC .............. *G02B2027/0187* (2013.01); *G06T 2207/30208* (2013.01)

(56) References Cited

U.S. PATENT DOCUMENTS 8,745,058 B1 *   6/2014   Garcia-Barrio ............... 707/737
RE45,114 E *     9/2014   Maguire, Jr. .................. 348/121
8,994,613 B1 *   3/2015   Johnson et al. ................ 345/8
9,025,252 B2 *   5/2015   Lewis et al. .................. 359/630
2014/0118357 A1* 5/2014   Covington .................... 345/473

OTHER PUBLICATIONS

Kato H., et al.,"Marker tracking and HMD calibration for a video-based augmented reality conferencing system", Augmented Reality, 1999. (IWAR '99). Proceedings. 2ND IEEE and ACM International Workshop on San Francisco, CA, USA Oct. 20-21, 1999, Los Alamitos, CA, USA,IEEE Comput. Soc, US, pp. 85-94, XP010358756, DOI: 10.1109/IWAR.1999.803809 ISBN: 978-0-7695-0359-2.

\* cited by examiner

AUTOMATIC CALIBRATION OF SCENE CAMERA FOR OPTICAL SEE-THROUGH HEAD MOUNTED DISPLAY

CROSS-REFERENCE TO RELATED APPLICATION(S)

This application claims the benefit of U.S. Provisional Application Ser. No. 61/867,551, entitled "Automatic Scene Camera Calibration Utilizing the Eye Gaze Base Point Readings for Head Mounted Displays" and filed on Aug. 19, 2013, which is expressly incorporated by reference herein in its entirety.

BACKGROUND

1. Field

The present disclosure relates generally to augmented reality (AR) devices, e.g., AR eyeglasses, having optical see-through head mounted displays (HMD) and eye tracking capability, and more particularly, to automatic calibration of the scene camera of such AR devices. AR is a technology in which a user's view of the real world is enhanced with additional information generated from a computer model. The enhancements may include labels, 3D rendered models, or shading and illumination changes. AR allows a user to work with and examine the physical real world, while receiving additional information about the objects in it.

2. Background

AR devices typically include an optical see-through HMD and one or more user input mechanisms that allow users to simultaneously see and interact with their surroundings while interacting with applications, such as e-mail and media players. User input mechanisms may include one or more of gesture recognition technology, and eye tracking technology. AR devices also allow a user to view real-world scenes through optical see-through HMDs together with two-dimensional (2D) or three-dimensional (3D) augmented reality content displayed on the HMDs.

It is difficult for the user of an AR device with optical see-through HMDs to see 3D augmented reality that is well aligned with markers or objects in the real world for each eye. In order to see a well-aligned augmented reality on each eye, a scene camera of the AR device needs to be calibrated for each eye of the user. Existing scene camera calibration processes are very cumbersome. Users typically have to go through a 12-step calibration process for each eye to be able to see a well-aligned augmented reality. After initial calibration, further calibration may be necessary if the user repositions the AR device on his face Furthermore, since the eye distance between a user's eye and the HMD varies among users, the calibrated data, also referred to as "projection matrix," for one user does not work well for other users. Accordingly, while one user of an AR device may see 3D augmented reality aligned with the real world object, another user of the same AR device may not have the same experience. As such, each individual user of an AR device needs to go through the cumbersome calibration steps for experiencing AR properly aligned with real world. In the best case, relying on pre-existing calibration data, users still need 4-step calibration process.

SUMMARY

In an aspect of the disclosure, a method, an apparatus, and a computer program product for calibrating an augmented reality (AR) device having an optical see-through head mounted display (HMD) are disclosed. An example apparatus obtains eye coordinates in an eye coordinate system corresponding to a location of an eye of a user of the AR device, and obtains object coordinates in a world coordinate system corresponding to a location of a real-world object in the field of view of the AR device, as captured by a scene camera having a scene camera coordinate system. The apparatus calculates screen coordinates in a screen coordinate system corresponding to a display point on the HMD, where the calculating is based on the obtained eye coordinates and the obtained object coordinates. The apparatus calculates calibration data based on the screen coordinates, the object coordinates and a transformation from the target coordinate system to the scene camera coordinate system. The apparatus then derives subsequent screen coordinates for the display of AR in relation to other real-world object points based on the calibration data.

DETAILED DESCRIPTION

Figure 1:
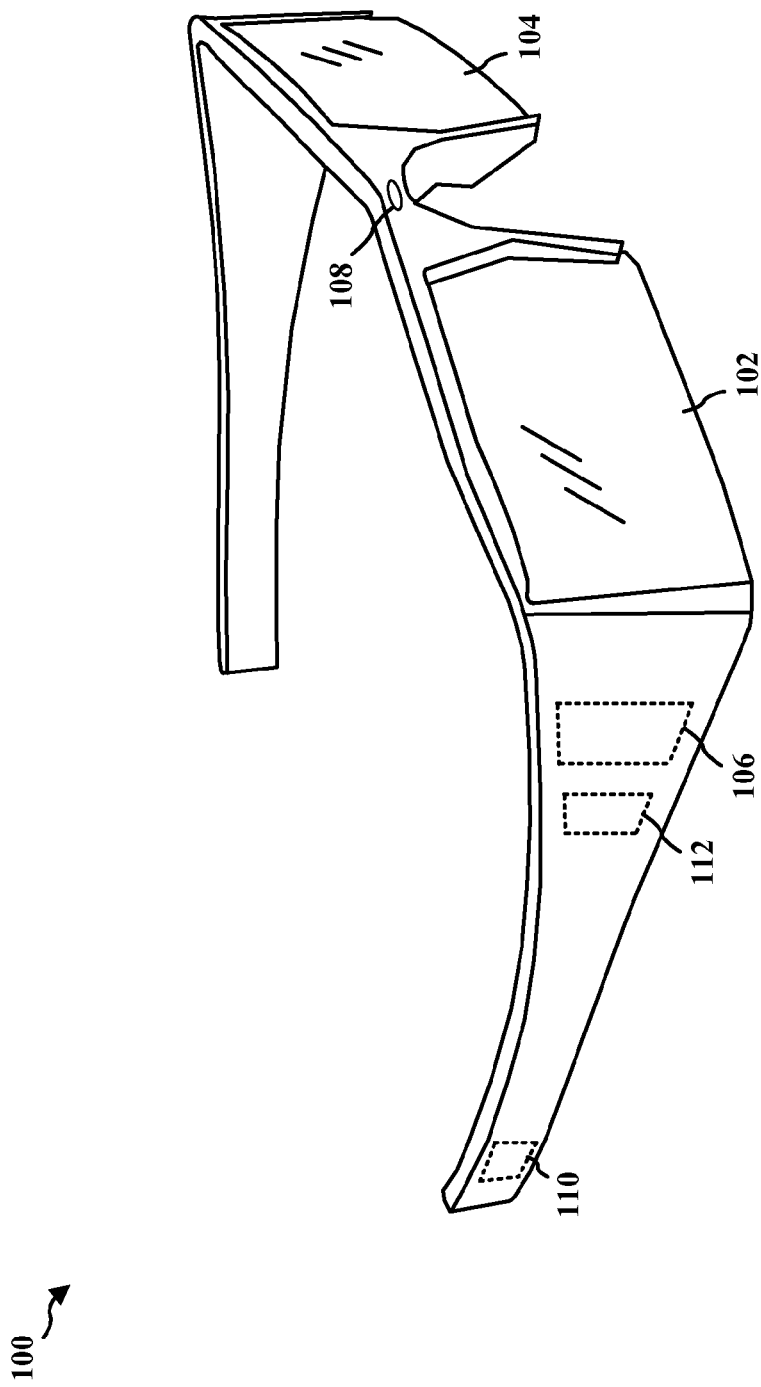
FIG. 1 is an illustration of an AR device in the form of a pair of eyeglasses.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects related to automatic calibration of the scene camera of AR devices will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is an illustration of an example AR device 100 in the form of a pair of eyeglasses. The AR device 100 is configured such that the user of the device is able to view real-world scenes through optical see-through HMDs together with content displayed on the HMDs, including both two-dimensional (2D) and three-dimensional (3D) AR content. The AR device 100 may also be configured to allow the user to interact with the content and possibly with remote devices, systems or networks through wireless communication. The AR device may also provide feedback to the user as a result of such interactions, including for example, audio, video or tactile feedback. To these ends, the example AR device 100 includes a pair of optical see-through HMDs 102, 104, an on-board processing system 106, one or more sensors, such as a scene camera 108, one or more eye tracking components (not visible) for each of the right eye and left eye, one or more user-interaction feedback devices 110 and a transceiver 112.

The processing system 106 and the eye tracking components provide eye tracking capability. Depending on the eye tracking technology being employed, eye tracking components may include one or both of eye cameras and infra-red emitters, e.g. diodes. The processing system 106 and the scene camera 108 provide gesture tracking capability.

The feedback devices 110 provide perception feedback to the user in response to certain interactions with the AR device. Feedback devices 110 may include a speaker or a vibration device. Perception feedback may also be provided by visual indication through the HMD.

The transceiver 112 facilitates wireless communication between the processing system 106 and remote devices, systems or networks. For example, the AR device may communicate with remote servers through the transceiver 112 for purposes of remote processing, such as on-line searches through remote search engines.

Figure 2:
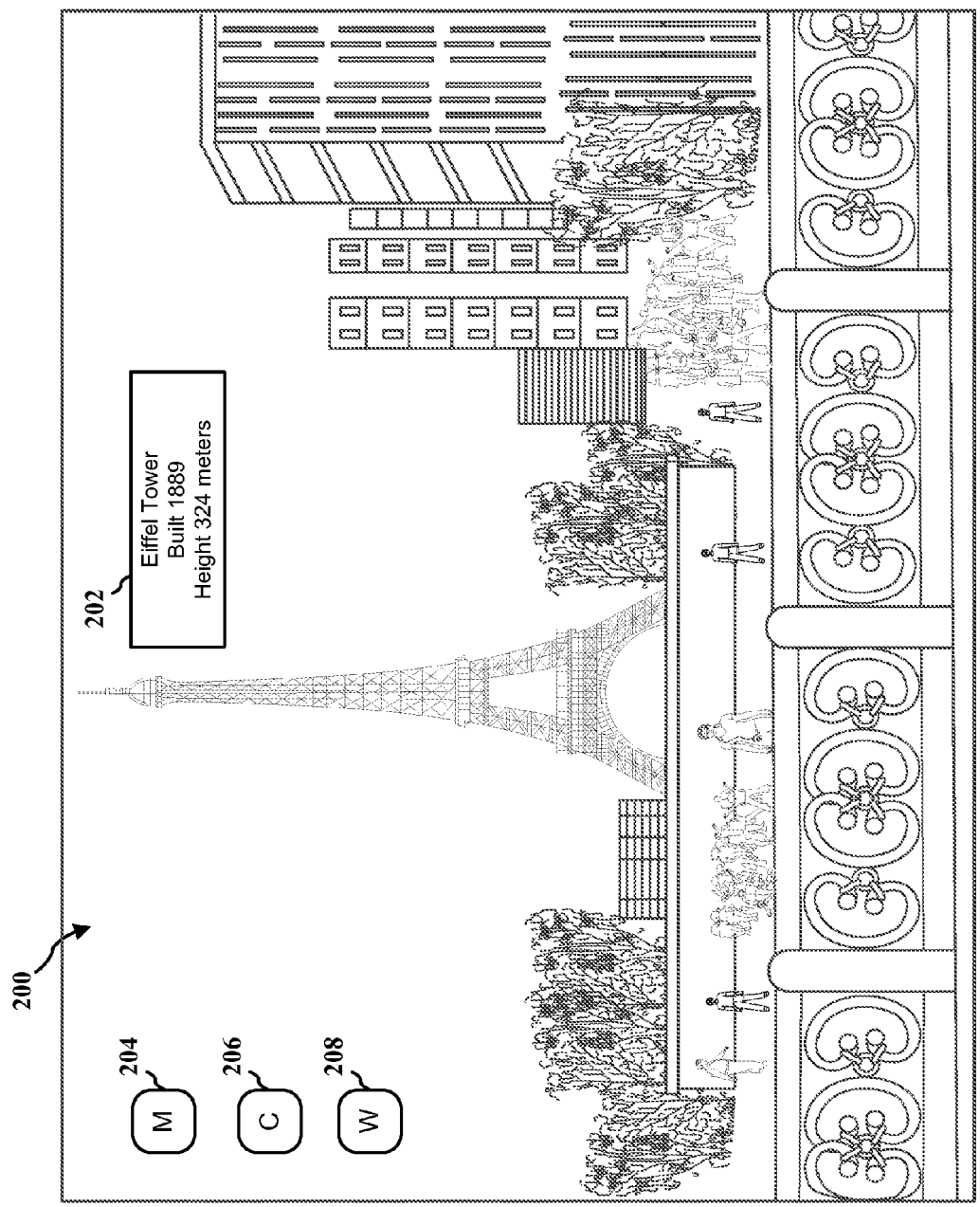
FIG. 2 is an illustration of a real-world scene through an optical see-through HMDs with augmented reality.

As mention above, the AR device 100 allows a user to view real-world scenes through optical see-through HMDs together with content displayed on the HMDs. For example, with reference to FIG. 2, as a user is viewing a real-world scene 200 through the optical see-through HMDs 102, 104, the scene camera 108 may capture an image of the scene and send the image to the on-board processing system 106. The processing system 106 may process the image and output AR content 202 for display on the HMDs 102, 104. The content 202 may provide information describing what the user is seeing. In some cases, the processing system 106 may transmit the image through the transceiver 112 to a remote processor (not shown) for processing. The processing system 106 may also display one or more application icons 204, 206, 208 on the HMDs 102, 104 and output application content, such as e-mails, documents, web pages, or media content such as video games, movies or electronic books, in response to user interaction with the icons.

User interaction with the AR device 100 is provided by one or more user input mechanisms, such as a gesture tracking module or an eye-gaze tracking module. Gesture tracking is provided by the scene camera 108 in conjunction with a gesture tracking module of the processing system 106. With gesture tracking, a user may attempt to activate an application by placing his finger on an application icon 204, 206, 208 in the field of view of the AR device. The scene camera 108 captures an image of the finger and sends the image to the gesture tracking module. The gesture tracking module processes the image and determines coordinates of a gesture point corresponding to where the user is pointing. The processing system 106 compares the coordinate location of the gesture point to the coordinate location of the icon on the display. If the locations match, or are within a threshold distance of each other, the processing system 106 determines that the user has selected the icon 204, 206, 208 and accordingly, launches the application.

Eye-gaze tracking is provided by the eye tracking components (not visible) in conjunction with an eye tracking module of the processing system 106. A user may attempt to activate an application by gazing at an application icon 204, 206, 208 in the field of view of the AR device. The eye tracking components capture images of the eyes, and provide the images to the eye tracking module. The eye tracking module processes the images and determines coordinates of an eye-gaze point corresponding to where the user is looking. The processing system 106 compares the coordinate location of the eye-gaze point to the coordinate location of the icon on the display. If the locations match, or are within a threshold distance of each other, the processing system 106 determines that the user has selected the icon 204, 206, 208 and accordingly, launches the application. Often, such eye-gaze based launching is coupled with another form of input, e.g., gesture, to confirm the user's intention of launching the application.

Figure 3:
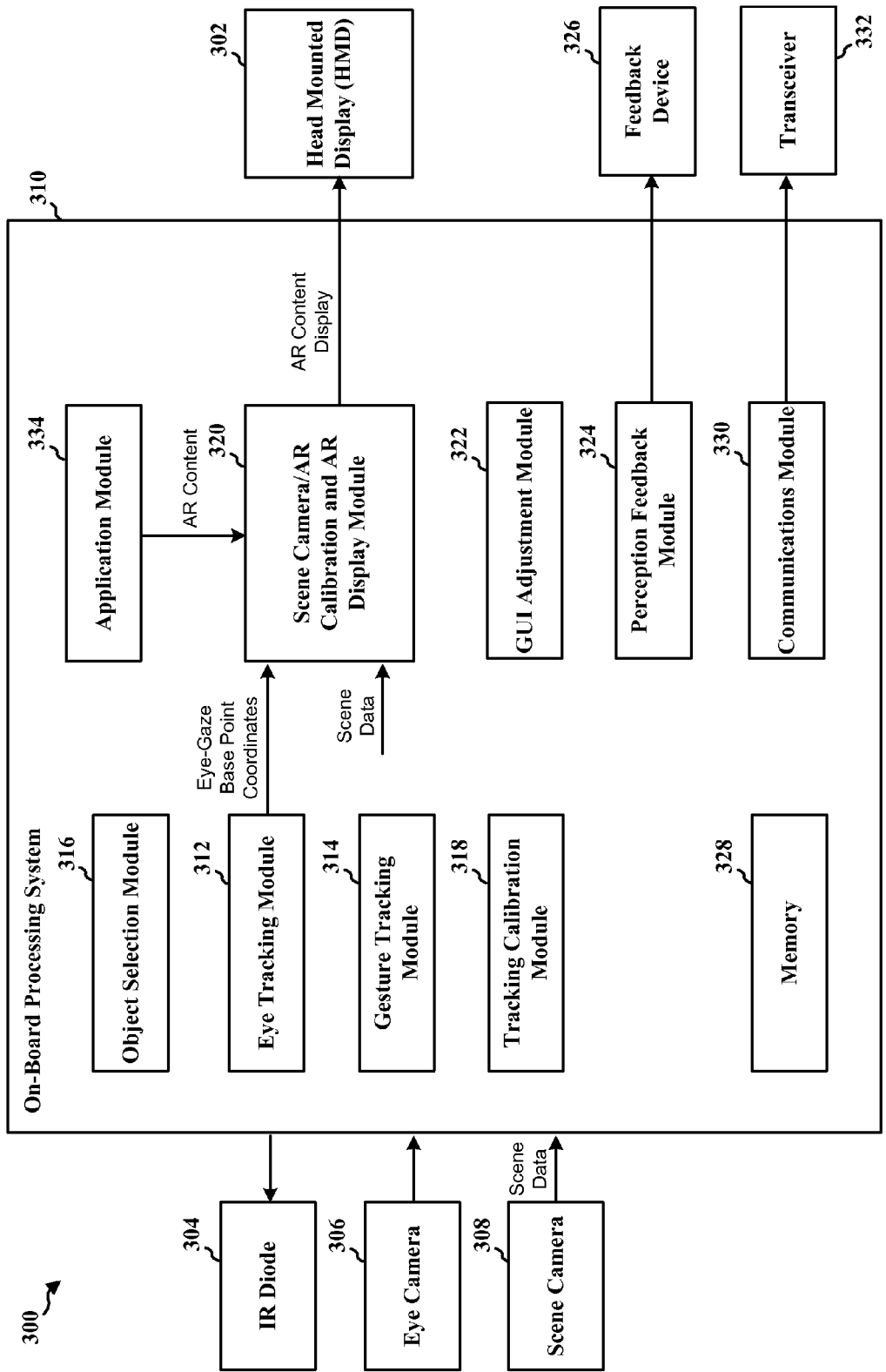
FIG. 3 is a diagram illustrating elements of an AR device.

FIG. 3 is a diagram illustrating elements of an example AR device 300 with optical see-through HMDs 302. The AR device 300 may include one or more sensing devices, such as infrared (IR) diodes 304 facing toward the wearer of the AR device and eye cameras 306 facing toward the wearer. A scene camera 308 facing away from the wearer captures images of the field of view seen by the user through the HMD 302. The cameras 306, 308 may be video cameras. While only one IR diode 304 and one eye camera 306 are illustrated, the AR device 300 typically includes several diodes and cameras for each of the left eye and right eye. A single scene camera 308 is usually sufficient. For ease of illustration only one of each sensor type is shown in FIG. 3.

The AR device 300 includes an on-board processing system 310, which in turn includes one or more of an eye tracking module 312 and a gesture tracking module 314. The object selection processor 316 functions to determine whether interactions of the user, as characterized by one or more of the eye tracking module 312 and the gesture tracking module 314, correspond to a selection of an object, e.g., application icon, displayed on the HMD 302 and visible in the field of view. If an interaction does correspond to a selection by the user, for example, a selection of an icon to launch an application 334, the object selection processor 316 outputs a command to the application. A tracking calibration module 318 calibrates the one or more tracking modules if the tracking module is determined to be inaccurate.

The on-board processing system 310 may also include a scene camera/AR calibration module 320, a graphical user interface (GUI) adjustment module 322, and a perception feedback module 324. As described further below, the scene camera/AR calibration module 320 calibrates the AR device so that AR content displayed on the optical see-through HMD 302 is aligned with real world objects seen through the HMD. The GUI adjustment module 322 may adjust the parameters of GUI objects displayed on the HMD to compensate for eye-tracking or gesture-tracking inaccuracies detected by the object selection module 316. Such adjustments may precede, supplement, or substitute for the actions of the tracking calibration module 318. The feedback module 324 controls one or more feedback devices 326 to provide perception feedback to the user in response to one or more types of user interactions. For example, the feedback module a feedback device 326 to output sound when a user selects an icon in the field of view using a gesture or eye gaze.

The AR device 300 further includes memory 328 for storing program code to implement the foregoing features of the on-board processing system 310. A communications module 330 and transceiver 332 facilitate wireless communications with remote devices, systems and networks. For example, in one implementation, an image of a real-world object may be captured by the scene camera 308 and transmitted by the communications module 330 and the transceiver 332 to a remote search engine, with subsequent search results being received by the transceiver.

With further respect to eye tracking capability, the diodes 304 and eye cameras 306, together with the eye tracking module 312, provide eye tracking capability as generally described above. In the example implementation of FIG. 3, the eye tracking capability is based on known infrared technology. One such known technology uses infrared light emitting diodes and infrared sensitive video camera for remotely recording images of the eye. Infrared light output by the diode 304 enters the eye and is absorbed and re-emitted by the retina, thereby causing a "bright eye effect" that makes the pupil brighter than the rest of the eye. The infrared light also gives rise to an even brighter small glint that is formed on the surface of the cornea. The eye tracking module 312 acquires a video image of the eye from the eye camera 306, digitizes it into a matrix of pixels, and then analyzes the matrix to identify the location of the pupil's center relative to the glint's center, as well as a vector between these centers. Based on the determined vector, the eye tracking module 312 outputs eye gaze coordinates defining an eye gaze point (E).

As mentioned above, AR devices having optical see-through HMDs require calibration in order to render AR content that is properly aligned with real-world object. The state of the art in AR calibration generally requires at least a twelve step calibration process for both eyes to obtain calibration data, e.g., a projection matrix (P), and thus exhibits cumbersome user experience. Further, projection matrixes (P) are user specific so that a projection matrix of one user does not work well for other users. Therefore, individual user needs to go through such cumbersome calibration steps for experiencing AR properly aligned with real world.

Disclosed herein is an automatic AR device calibration approach where the user does not need to perform any manual calibration steps. In this approach, an entire projection matrix (P) for positioning AR on an HMD so as to be properly aligned with real-world objects is computed. The projection matrix (P) is computed on the fly based on the eye position of a user as provided by the eye tracking module 312, known coordinates of the real-world object as provided by a model view matrix (M), and known transformations of different coordinate systems, such as the scene camera 308 coordinate system, the eye camera 306 coordinate system, and the HMD 302 coordinate system. These coordinates and transformations may be provided by functional modules of the AR calibration module 320. In another possible approach, only a few of the parameters in the projection matrix (P) are determined for a current user of the AR device, with the remaining parameters being carried over from a prior user of the AR device.

Figure 4:
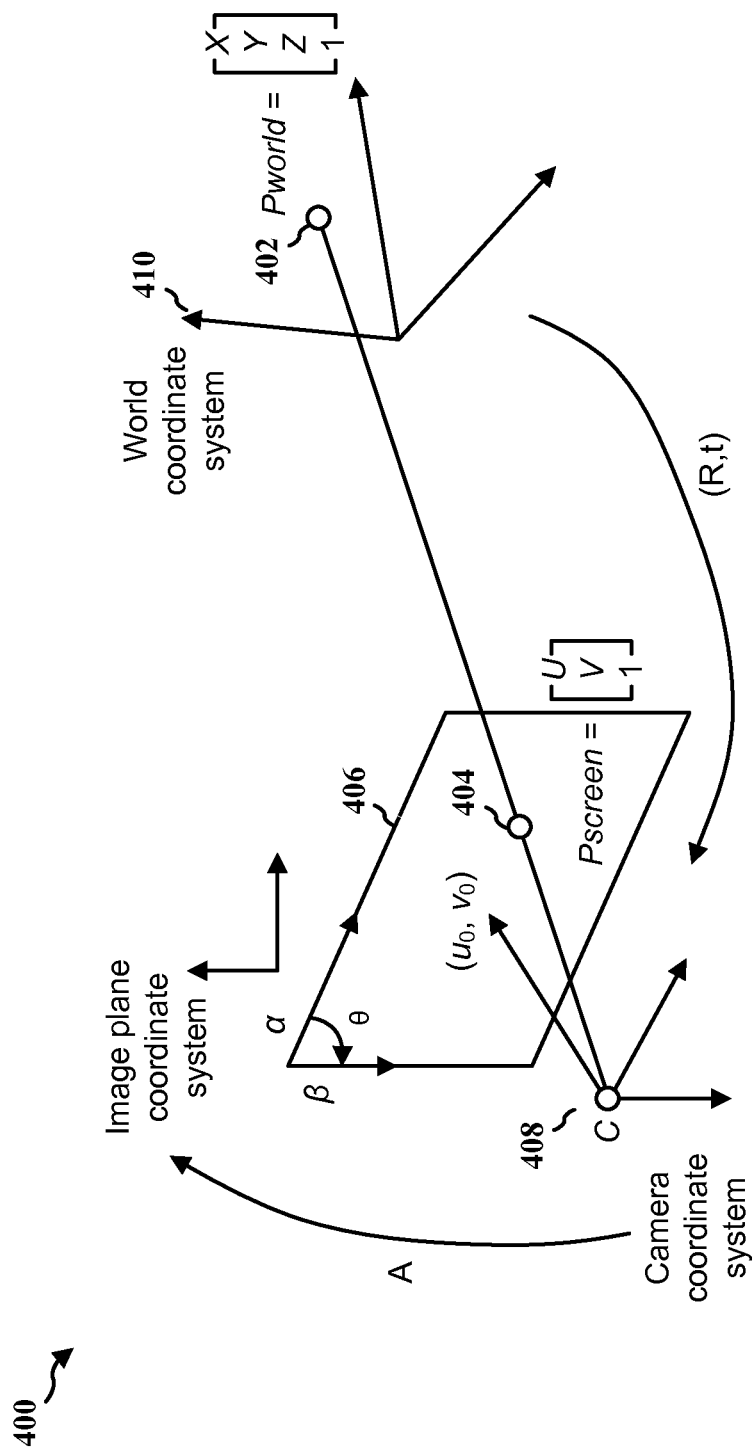
FIG. 4 is an illustration of a pinhole camera model.

Pinhole Camera Model:

FIG. 4 is an illustration 400 of a pinhole camera model, showing a pinhole camera converting a 3D world point $p_{world}=[X\ Y\ Z\ 1]^T$ to a 2D image point $p_{screen}=[u\ v\ 1]^T$. The calibration approach disclosed herein is based on the pinhole camera model. The image of a 3D point 402, denoted by $p_{world}=[X\ Y\ Z\ 1]^T$, is formed by an optical ray 412 from $p_{world}$ 402 passing through the optical center C 408 and intersecting an image plane 406 at a 2D image point, denoted by $p_{screen}=[u\ v\ 1]^T$. The three points $p_{world}$, $p_{screen}$, and C are collinear. For illustration purpose, the image plane 406 is positioned between the scene point 402 and the optical center 408, which is mathematically equivalent to the physical setup under which the image plane is in the other side with respect to the optical center.

A simple pinhole model camera is used for describing the transformation from a real-world 3D scene defined by a plurality of 3D points 402 (only one is shown for clarity of illustration) defined in the world coordinate system 410 to a 2D screen image defined by a corresponding plurality of 2D image points 404 (only one is shown for clarity of illustration) on an image surface 406.

The model is defined by a set of extrinsic parameters [R, t] and intrinsic parameters (A). Extrinsic parameters [R, t] define the camera position 408 and orientation with respect to the world coordinate system 410 and can be described with a transformation containing rotation (R) and translation (t) as shown in Eq. (1).

$$\text{Extrinsic parameters} = [Rt] = \begin{bmatrix} r_{11} & r_{12} & r_{13} & t_1 \\ r_{21} & r_{22} & r_{23} & t_2 \\ r_{33} & r_{32} & r_{33} & t_3 \end{bmatrix} \quad \text{Eq. (1)}$$

Intrinsic parameters (A) define the optical properties of the camera and cam be defined as shown in Eq. (2).

$$\text{Intrinsic parameters} = A = \begin{bmatrix} \alpha & \gamma & u_0 \\ 0 & \beta & v_0 \\ 0 & 0 & 1 \end{bmatrix} \quad \text{Eq. (2)}$$

where:
(u0, v0) are the coordinates of the principal point,
α and β the scale factors in image u and v axes, and
γ the parameter describing the skew of the two image axes.

In FIG. 4, the angle between the two image axes is denoted by θ, and we have γ=α cot θ. If the pixels are rectangular, then θ=90° and γ=0.

These intrinsic and extrinsic parameters define a camera's projection matrix (P) as shown in Eq. (3).

$$\text{Camera projection matrix, } P = A[R\ t] \quad \text{Eq.(3)}$$

Once this projection matrix (P) is obtained from calibration, a 2D point $p_{screen}$ 404 on the image plane 406 can be computed from a world point 402 $p_{world}$ using Eq. (4).

$$sp_{screen} = Pp_{world} \quad \text{Eq.(4)}$$

where s is an arbitrary scale factor.

The task of camera calibration is to determine the parameters of the transformation between an object in 3D space and the 2D image observed by the camera from visual information (images). The transformation includes the above described extrinsic parameters (sometimes called external parameters): orientation (rotation (R) parameters of Eq. 1) and location (translation (t) parameters of Eq. 1) of the camera, i.e., [R t], and the above described intrinsic parameters (sometimes called internal parameters).

The rotation matrix (R), although consisting of nine elements, only has three degrees of freedom. The translation vector t has 3 parameters. Therefore, there are six extrinsic parameters and five intrinsic parameters, leading a total of eleven parameters.

HMD AR Transformation System:

To be able to correctly merge the real and the virtual world during user interaction with a dynamic scene, an AR system maintains a computer model to represent the location of real and virtual objects. The spatial relationships are normally modeled using linear transformation matrices. As 4-by-4 matrices, they can be aggregated through multiplication to symbolize the traversal through local coordinate systems and so describe the exact location of surrounding objects relative to the user's eye.

Figure 5:
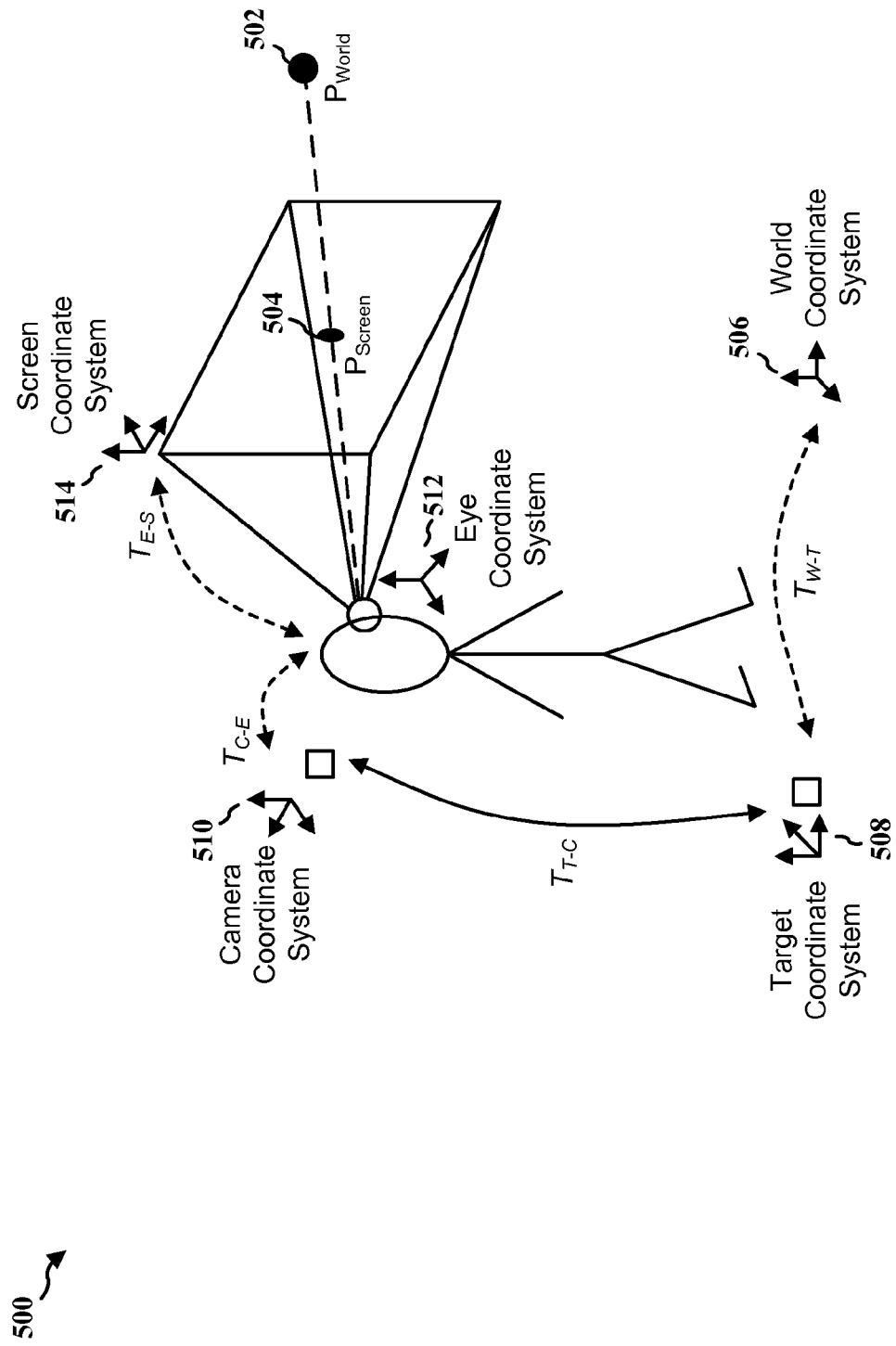
FIG. 5 is an illustration of an HMD augmented reality system, showing the coordinate systems involved in a typical HMD AR system.

FIG. 5 is an illustration 500 of an HMD augmented reality system, showing the coordinate systems involved in a typical HMD AR system. Similar to the pinhole camera, the HMD AR system transforms a 3D world point 502 to a 2D screen point 504. However, unlike the pinhole camera model, the HMD AR model consists of more than two coordinate systems. Here, a 3D world point 502 in the world coordinate system 506 is first converted into a target (i.e. image target) coordinate system 508. The coordinates of the 3D world point in the target coordinates system 508 are then converted into a scene camera coordinate system 510. The coordinates of the 3D world point in the scene camera coordinates system 510 are then converted into an eye coordinate system (monocular) 512. Finally the coordinates of the 3D world point in the eye camera coordinate system 512 are converted into a screen coordinate system 514.

The transformation across all five coordinate systems is as shown in Eq. (5). Here, and throughout all equations, $T_{x\text{-}y}$ represents transformation from an x coordinate system to a y coordinate system.

$$p_{screen} = T_{E\text{-}S} T_{C\text{-}E} T_{T\text{-}C} T_{W\text{-}T} p_{world} \quad \text{Eq.(5)}$$

Here, it is assumed that the world-to-target coordinate system is identity as shown in Eq. (6).

$$T_{W\text{-}T} = I \text{ (assumption)} \quad \text{Eq.(6)}$$

The transformation from target coordinate system 508 to scene camera coordinate system 510 can be obtained from a model view matrix (M) as shown in Eq. (7).

$$T_{T\text{-}C} = M \quad \text{Eq.(7)}$$

Therefore, the transformation from scene camera coordinate system 510 to eye coordinate system 512 and from eye coordinate system 512 to screen coordinate system 514 in the HMD calibration process is estimated. Eq. (8) shows the final transformation from 3D world point 502 to 2D screen point 504.

$$\text{Need to estimate, } P = T_{E\text{-}S} T_{C\text{-}E} \quad \text{Eq.(8)}$$

Conventional HMD Calibration:

A single point active alignment method (SPAAM) for monocular HMD calibration has been proposed. In this method, a user wearing the HMD aligns a 2D point shown on the display with a real world point in the real world coordinate system by moving her body and head. From a set of such correspondences, the projection matrix P is computed as shown in Eq. (9).

$$p_{screen} = PM p_{world} \quad \text{Eq.(9)}$$

Since a projection matrix contains eleven degrees of freedom (DOF), a user needs to perform at least six step calibration (each step provides two equations for x and y) for an eye, and repeat the same method for the other eye.

Figure 6:
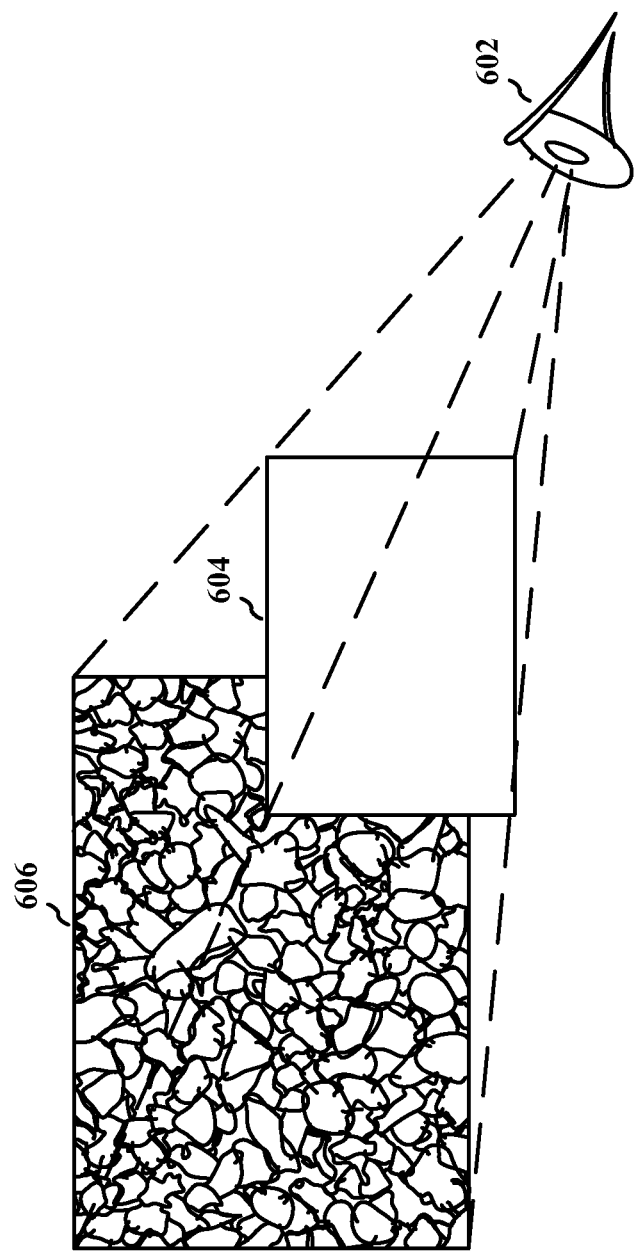
FIG. 6 is an illustration of a user aligning augmented reality 604 with an image target for conventional HMD calibration.

FIG. 6 is an illustration 600 of a user 602 aligning augmented reality 604 with an image target 606 for conventional HMD calibration. This method draws a rectangle at a fixed screen position. The user wearing the HMD aligns the rectangle 604 with the AR target 606. Once the rectangle 604 and target 606 are aligned, the user 602 taps the screen. This is repeated for 6 rectangles for each eye, all drawn at slightly different locations.

The formula for calculating the projection matrix is as follows:

$$PMV = C \quad \text{Eq.(10)}$$

where:
P=Projection matrix
M=Model-view matrix
V=3D vertices of the rectangle to be drawn
C=screen coordinates of rectangle (on the image plane)

The static rectangle 604 is drawn with a static model view matrix (M), and the projection matrix (P) of the scene camera. When the user aligns the static rectangle 604 with the real world marker 606, they are aligning the screen coordinates C with the real world marker 606. When the alignment is done, the coordinates of the origin or center (C) of the screen is the same value as the center of the scene camera. Thus, a user's aligned model-view matrix (M) is used to calculate the user's projection matrix (P). Since the projection matrix (P) contains eleven degrees of freedom, six pairs of screen coordinates are used to calculate the projection matrix (P).

A decomposition of the user's projection matrix (P) calculated from this approach is as follows:

$$P = A[R\ t] \qquad \text{Eq.(11)}$$

where:
[R t]=rotation matrix (R) and translation matrix (t) from the scene camera coordinate system 510 to the eye coordinate system 512.
A=projection from the 3D model of eye coordinate system 512 to 2D image plane 516. A composes intrinsic parameters of the eye, including the focal length, and the image center.

Automatic Zero Step Calibration for HMD:

In the AR calibration approach disclosed herein, a reference user's projection matrix (P) is not relied on for computing a new user's projection matrix (P). Instead, the entire projection matrix (P) of the user is automatically computed. Such computation may occur each time a user puts on the AR device, or periodically while the user is already wearing the AR device. As mention above, the computation of the projection matrix (P) is based on the new user's eye position, real-world object coordinates obtained from a model view matrix (M), and transformations of different coordinate systems.

Figure 7:
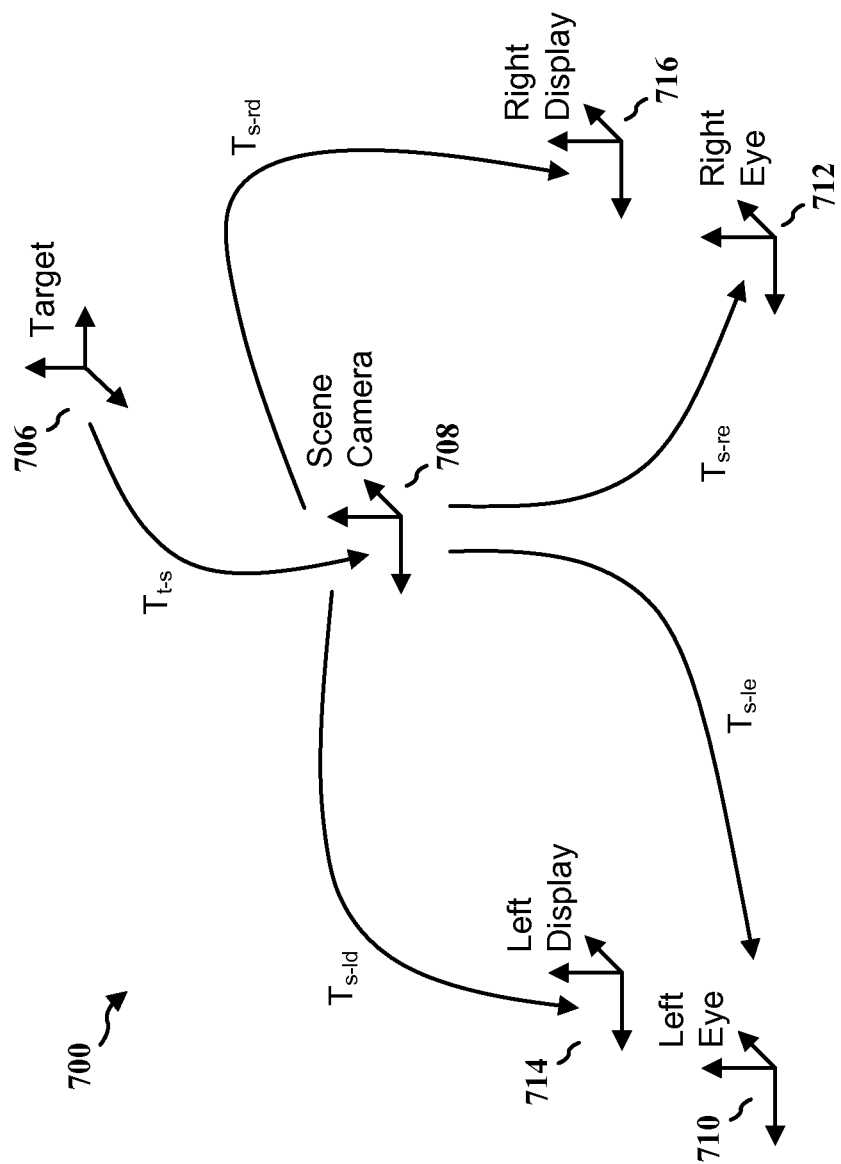
FIG. 7 is an illustration of the various coordinate systems with respect to an AR device having a right eye HMD and a left eye HMD.

FIG. 7 is an illustration 700 of the various coordinate systems with respect to an AR device having a right eye HMD 702 and a left eye HMD 704. Each coordinate system has a corresponding origin and direction. The origin of the target coordinate system 706 is the center of the object in the real world that an AR is to be associated with. This object may also be referred to as the target or marker. The origin of the scene camera coordinate system 708 is the center of the scene camera 308 of the AR device. The origin of the left eye coordinate system 710 is the center, or eye-gaze base point, of the user's left eye as determined by the eye camera 306 of the left eye and the eye tracking module 312. The origin of the right eye coordinate system 712 is the center, or eye-gaze base point, of the user's right eye as determined by the eye camera 306 of the right eye and the eye tracking module 312. The origin of the left display coordinate system 714 is the center of the left HMD 704. The origin of the right display coordinate system 716 is the center of the right HMD 702.

Figure 8:
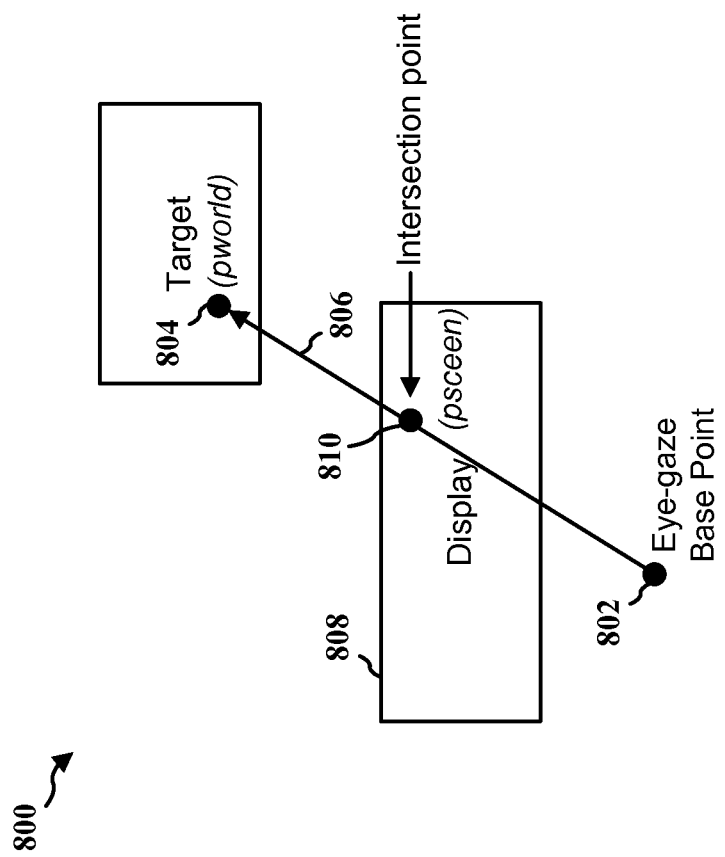
FIG. 8 is an illustration of aspects of a calibration process for a single display.

FIG. 8 is an illustration 800 of aspects of a calibration process for a single display 808. Coordinates of an eye-gaze base point 802, generally corresponding to the center of the user's eye, are obtained from the eye tracking module 312. Coordinates ($p_{world}$) of a real-world target 804, also referred to as an object or marker, are obtained based on a model view matrix (M). As noted above by Eq. (7), the model view matrix (M) corresponds to a transformation from a target coordinate system 706 to a scene camera coordinate system 708. The model view matrix (M) is derived using known processes and is provided to the AR device for use in the calibration process.

Once the coordinates of the eye-gaze base point 802 and the coordinates ($p_{world}$) world) of the target 804 are obtained, a ray 806 is defined. The ray 806 originates from the eye-gaze base point 802, intersects the display plane 808 and terminates at the target coordinates ($p_{world}$) 804. In terms of processing, a set of liner equations is solved to find the intersection point 810 of the ray 806 and the display 808. The coordinates of the intersection point corresponds to $p_{screen}$. A projection matrix (P) is determined as follows:

$$P = M p_{world} / p_{screen} \qquad \text{Eq.(12)}$$

where:
M is the known model view matrix
$p_{world}$ are the coordinates of the target 804, and
$p_{screen}$ are the coordinates of the intersection point 810.

Once the projection matrix (P) is determined, subsequent display points $p_{screen}$ for other real-world object points may be determined using the above Eq. 9.

Figure 9:
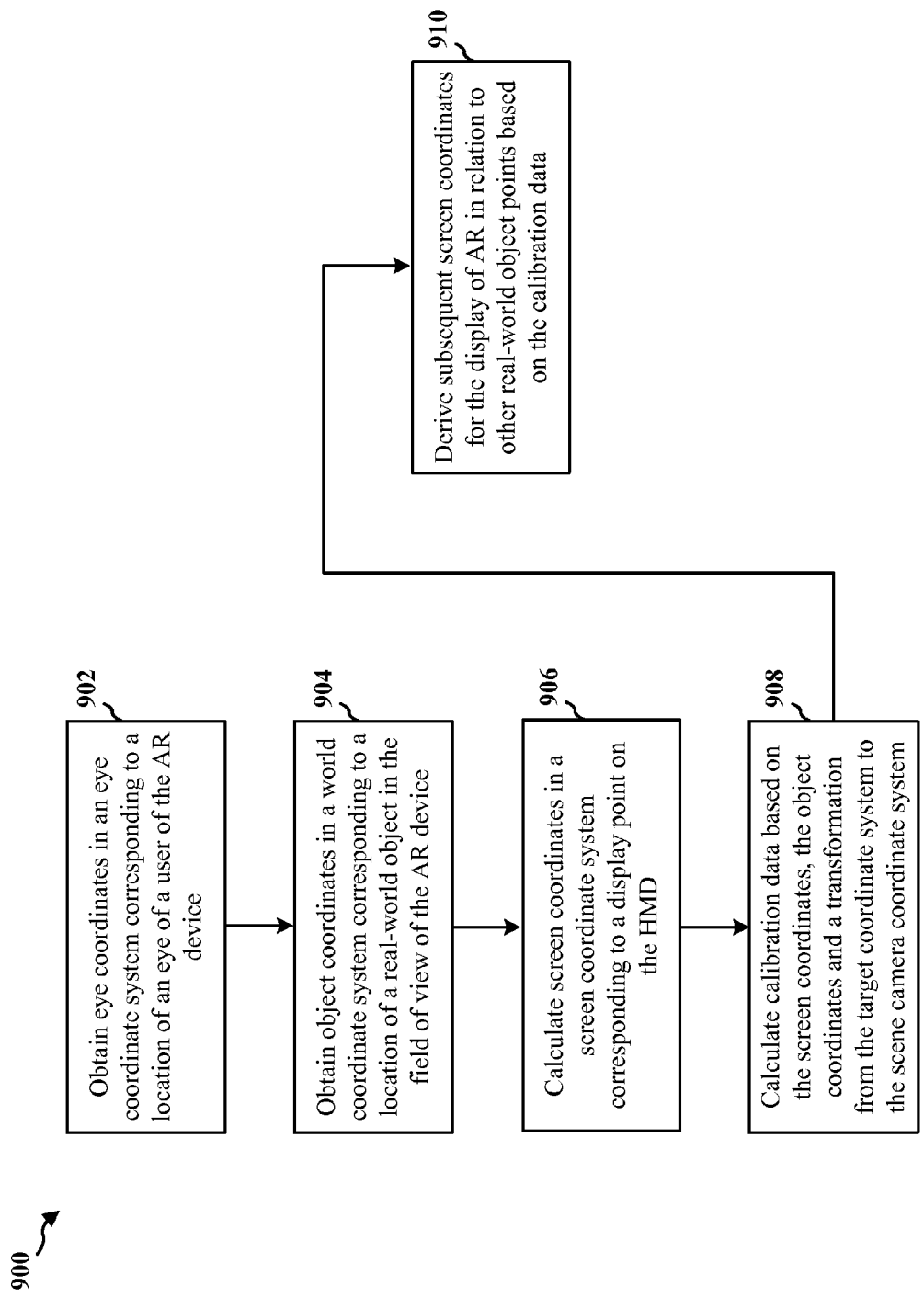
FIG. 9 is a flow chart of a method of a method of calibrating an AR device having an optical see-through HMD.

FIG. 9 is a flow chart 900 of a method of calibrating an AR device having an optical see-through HMD. The method may be performed by an AR device. In step 902, the AR device obtains eye coordinates 802 in an eye coordinate system corresponding to a location of an eye of a user of the AR device.

In step 904, the AR device obtains object coordinates 804 in a world coordinate system corresponding to a location of a real-world object in the field of view of the AR device. The real-world object may be captured by a scene camera having a scene camera coordinate system.

In step 906, the AR device calculates screen coordinates 810 in a screen coordinate system corresponding to a display point on the HMD. The calculating is based on the eye coordinates and the object coordinates. In one configuration, the AR device calculates screen coordinates by defining a ray that originates from the eye coordinates, intersects the HMD and terminates at object coordinates; and calculating an intersection point of the ray and the HMD, the intersection point being the display point.

In step 908, the AR device calculates calibration data based on the screen coordinates, the object coordinates, and a transformation from the target coordinate system to the scene camera coordinate system. The transformation from the target coordinate system to the scene camera coordinate system may be characterized provided by a model view matrix (M), and the calibration data may correspond to a projection matrix (P). In step 910, the AR devices subsequent screen coordinates for the display of AR in relation to other real-world object points based on the calibration data.

Figure 10:
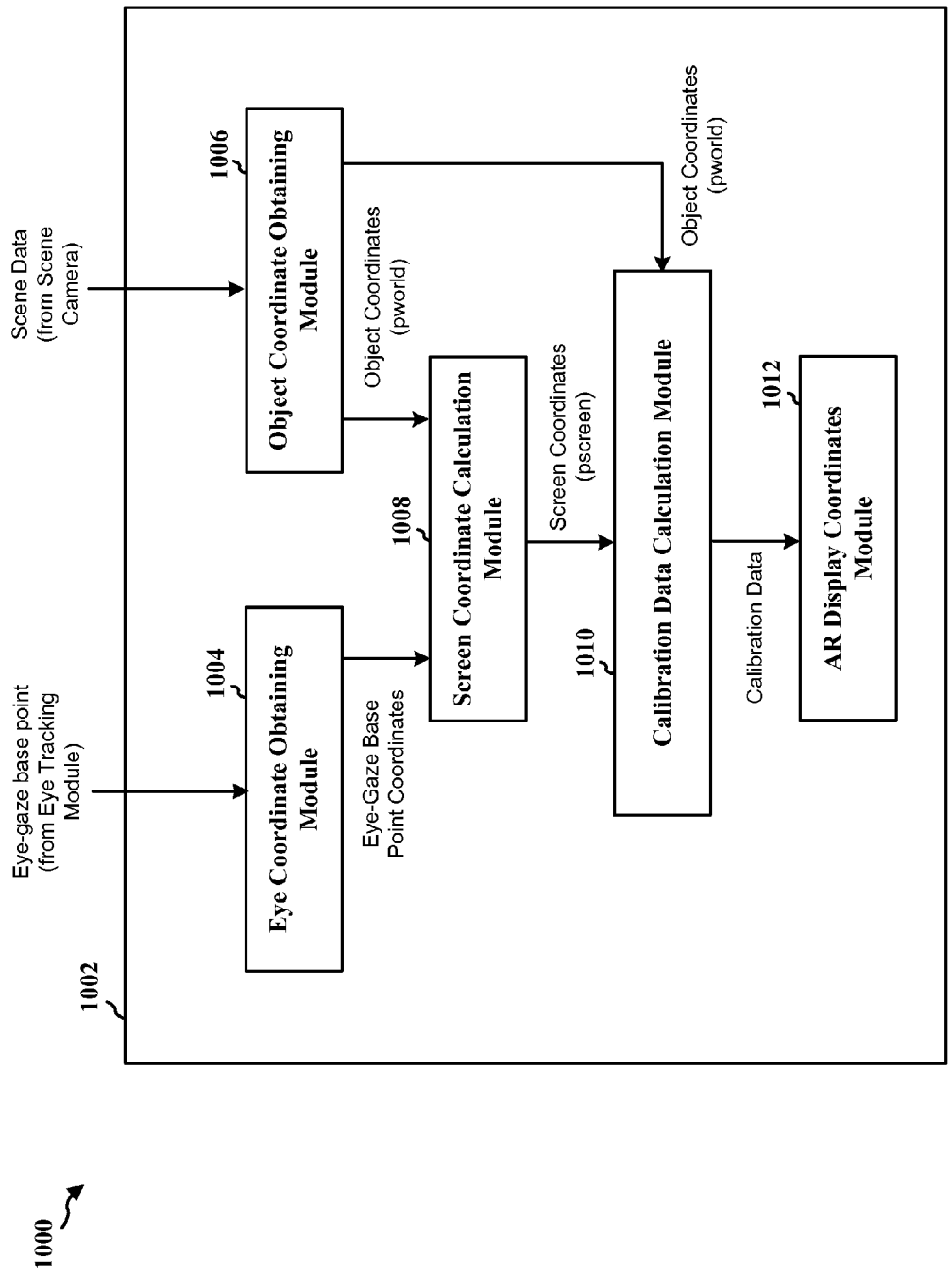
FIG. 10 is a diagram illustrating elements of an AR device with automatic calibration.

FIG. 10 is a diagram 1000 illustrating elements of an AR device 1002 that provides AR calibration. The AR device 1002 includes an eye coordinate obtaining module 1004, an object coordinate obtaining module 1006, a screen coordinate calculation module 1008, a calibration data calculation module 1010, and an AR display coordinate module 1012. These modules may correspond to one or more of the modules of FIG. 3. For example, all of the foregoing modules may be part of the AR calibration and AR display module 320.

The eye coordinate obtaining module 1004 obtains eye coordinates in an eye coordinate system. The eye coordinates correspond to a location of an eye of a user of the AR device. The eye coordinates may be obtained from an eye tracking module 312.

The object coordinate obtaining module 1006 obtains object coordinates in a world coordinate system corresponding to a location of a real-world object in the field of view of the AR device. The real-world object may be captured by a scene camera 308 having a scene camera coordinate system. Objects within the scene data are detected and their coordinates are determined based on a transformation from the target coordinate system to the scene camera coordinate system. Such transformation may be based on a known model view matrix (M).

The screen coordinate calculation module 1008 calculates screen coordinates in a screen coordinate system corresponding to a display point on the HMD 302. The calculating may be based on the eye coordinates obtained by the eye coordinate obtaining module 1004 and the object coordinates obtained by the object coordinate obtaining module 1006.

The calibration data calculation module 1010 calculates calibration data based on the screen coordinates, the object coordinates and the transformation from the target coordinate system to the scene camera coordinate system. The AR display coordinate module 1012 derives subsequent screen coordinates for the display of AR in relation to other real-world object points or target points based on the calibration data. The calibration data may be a projection matrix (P).

The AR device, as illustrated in FIGS. 3 and 10 may include additional modules that perform each of the steps of the algorithm in the aforementioned flow chart of FIG. 9. As such, each step in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
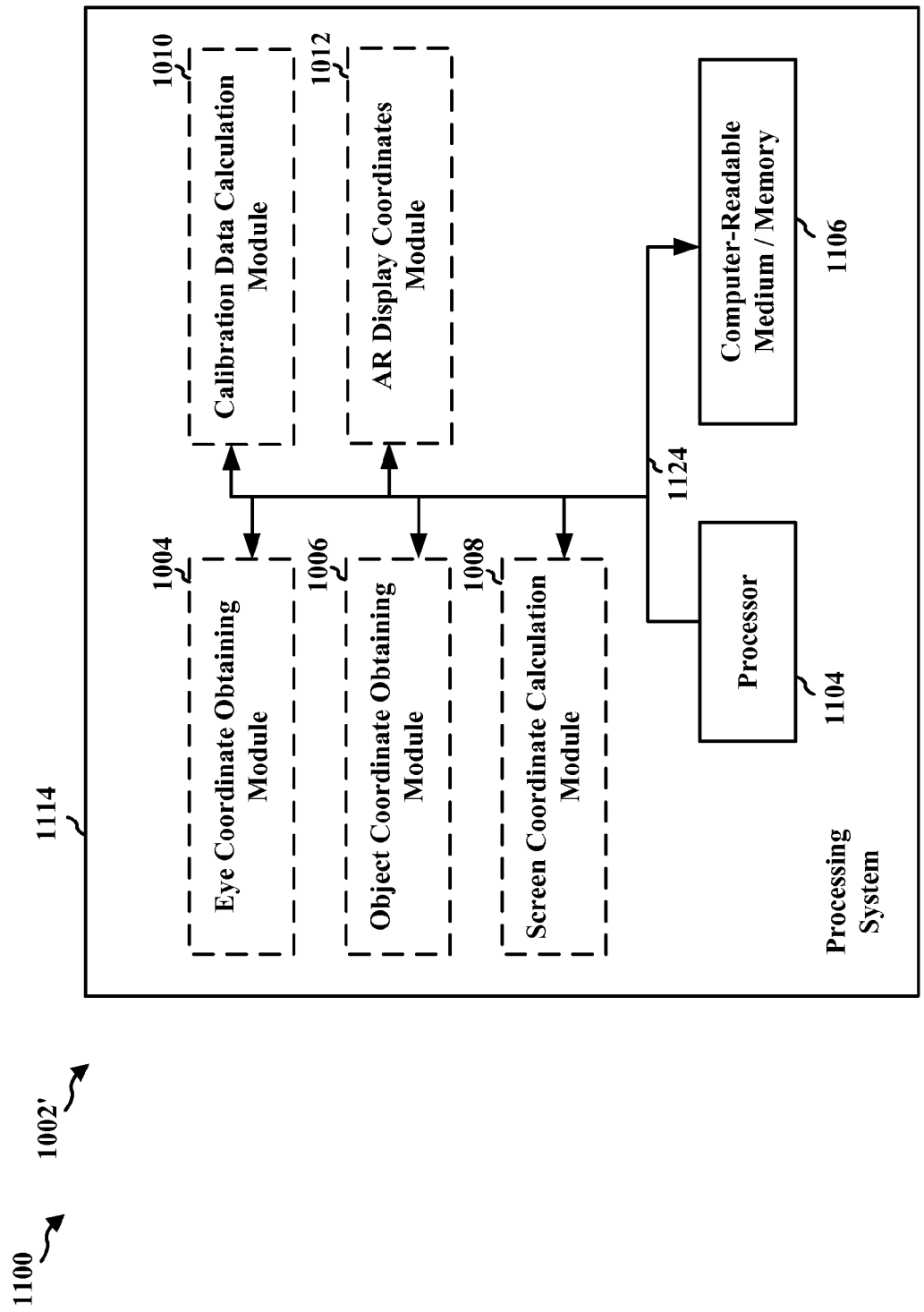
FIG. 11 a diagram illustrating an example of a hardware implementation for an AR device employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1004, 1006, 1008, 1010, 1012 and the computer-readable medium/memory 1106. The bus 1124 may also link various other circuits such as timing sources, peripherals, voltage regulators, and power management circuits, which are well known in the art, and therefore, will not be described any further.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system further includes at least one of the modules 1004, 1006, 1008, 1010 and 1012. The modules may be software modules running in the processor 1104, resident/stored in the computer readable medium/memory 1106, one or more hardware modules coupled to the processor 1104, or some combination thereof.

In one configuration, the apparatus 1002/1002' includes means for obtaining eye coordinates in an eye coordinate system corresponding to a location of an eye of a user of the AR device, means for obtaining object coordinates in a world coordinate system corresponding to a location of a real-world object in the field of view of the AR device, as captured by a scene camera having a scene camera coordinate system, means for calculating screen coordinates in a screen coordinate system corresponding to a display point on the HMD, the calculating being based on the eye coordinates and the object coordinates, means for calculating calibration data based on the screen coordinates, the object coordinates and a transformation from the target coordinate system to the scene camera coordinate system, and means for deriving subsequent screen coordinates for the display of AR in relation to other real-world object points based on the calibration data. The aforementioned means may be one or more of the aforementioned modules of the apparatus 1002 and/or the processing system 1114 of the apparatus 1002' configured to perform the functions recited by the aforementioned means.

In summary, AR device calibration achieved by computing an entire projection matrix on the fly based on a user's eye position as provided by an eye tracking module, and know transformations of different coordinate system, such as scene camera, eye camera and display. In an aspect of the disclosure, a method, an apparatus, and a computer program product for automatically calibrating a scene camera of a head mounted display. The method uses the eye gaze base point readings to calculate the user's projection matrix for each eye in real time. Then the projection matrix and the position of real-world marker/object together determine the coordinates of the augmented reality on the display:

A) The eye gaze base point readings are obtained in real-time. The position of a marker/object is known.
B) A ray passing through the eye gaze base point and the object/marker center intersects with the display.
C) The intersection points are calculated repeatedly for several different points and are used for the calculation of projection matrix for each eye.
D) The projection matrix for each eye is updated when the eye gaze base point changes, e.g., when the glasses move.

The advantage of this method is that: There is no scene camera calibration process required, as compared to the traditional 12-step calibration process. The traditional scene camera calibration method works for only one glasses position: if the glasses are moved on the nose, users will not see a well-aligned AR. The above method utilizes the real-time eye gaze base point reading, which will get updated if the glasses are moved. Therefore, the augmented reality rendering result is robust to glasses movement.

A method of calibrating a scene camera of a head mounted display (HMD) with eye tracking sensors worn by a user includes obtaining an eye gaze base point of the user when a target/marker/object is visible or virtually exists to the user through the HMD, calculating an intersection point of a ray with a display plane corresponding to the head mounted display, the ray passing through the eye and the first of the plurality of targets/markers/objects, repeating the obtaining and calculating for a plurality of different targets/markers/objects, and calculating a projection matrix for each eye based on the plurality of intersection points.

An apparatus for calibrating a scene camera of a head mounted display (HMD) with eye tracking sensors worn by a user includes means for obtaining an eye gaze base point of the user when a target/marker/object is visible or virtually exists to the user through the HMD, means for calculating an intersection point of a ray with a display plane corresponding to the head mounted display, the ray passing through the eye and the first of the plurality of targets/markers/objects, means for repeating the obtaining and calculating for a plurality of different targets/markers/objects, and means for calculating a projection matrix for each eye based on the plurality of intersection points.

Another apparatus for calibrating a scene camera of a head mounted display (HMD) with eye tracking sensors worn by a user, includes a memory; and at least one processor coupled to the memory and configured to obtain an eye gaze base point of the user when a target/marker/object is visible or virtually exists to the user through the HMD, calculate an intersection point of a ray with a display plane corresponding to the head mounted display, the ray passing through the eye and the first of the plurality of targets/markers/objects, repeat the obtaining and calculating for a plurality of different targets/markers/objects, and calculate a projection matrix for each eye based on the plurality of intersection points.

A computer program product for calibrating a scene camera of a head mounted display (HMD) with eye tracking sensors worn by a user, includes a computer-readable medium comprising code for obtaining an eye gaze base point of the user when a target/marker/object is visible or virtually exists to the user through the HMD, calculating an intersection point of a ray with a display plane corresponding to the head mounted display, the ray passing through the eye and the first of the plurality of targets/markers/objects, repeating the obtaining and calculating for a plurality of different targets/markers/objects, and calculating a projection matrix for each eye based on the plurality of intersection points.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of calibrating an augmented reality (AR) device having an optical see-through head mounted display (HMD), said method comprising:
    obtaining eye coordinates in an eye coordinate system corresponding to a location of an eye of a user of the AR device;
    obtaining object coordinates in a world coordinate system corresponding to a location of a real-world object in the field of view of the AR device, as captured by a scene camera having a scene camera coordinate system;
    calculating screen coordinates in a screen coordinate system corresponding to a display point on the HMD by a) defining a ray that originates from the eye coordinates, intersects the HMD and terminates at the object coordinates and b) calculating an intersection point of the ray and the HMD, the intersection point being the display point; and
    calculating calibration data based on the screen coordinates, the object coordinates and a transformation from a target coordinate system to the scene camera coordinate system.

2. The method of claim 1, further comprising deriving subsequent screen coordinates for the display of AR in relation to other real-world object points based on the calibration data.

3. The method of claim 1, wherein the calibration data corresponds to a projection matrix (P).

4. The method of claim 1, wherein the transformation from the target coordinate system to the scene camera coordinate system is provided by a model view matrix (M).

5. An apparatus for calibrating an augmented reality (AR) device having an optical see-through head mounted display (HMD), said apparatus comprising:
    means for obtaining eye coordinates in an eye coordinate system corresponding to a location of an eye of a user of the AR device;
    means for obtaining object coordinates in a world coordinate system corresponding to a location of a real-world object in the field of view of the AR device, as captured by a scene camera having a scene camera coordinate system;
    means for calculating screen coordinates in a screen coordinate system corresponding to a display point on the HMD by a) defining a ray that originates from the eye coordinates, intersects the HMD and terminates at the object coordinates and b) calculating an intersection point of the ray and the HMD, the intersection point being the display point; and
    means for calculating calibration data based on the screen coordinates, the object coordinates and a transformation from a target coordinate system to the scene camera coordinate system.

6. The apparatus of claim 5, further comprising means for deriving subsequent screen coordinates for the display of AR in relation to other real-world object points based on the calibration data.

7. The apparatus of claim 5, wherein the calibration data corresponds to a projection matrix (P).

8. The apparatus of claim 5, wherein the transformation from the target coordinate system to the scene camera coordinate system is provided by a model view matrix (M).

9. An apparatus for calibrating an augmented reality (AR) device having an optical see-through head mounted display (HMD), said apparatus comprising:
    a memory; and
    at least one processing module coupled to the memory and configured to:
        obtain eye coordinates in an eye coordinate system corresponding to a location of an eye of a user of the AR device;
        obtain object coordinates in a world coordinate system corresponding to a location of a real-world object in the field of view of the AR device, as captured by a scene camera having a scene camera coordinate system;
        calculate screen coordinates in a screen coordinate system corresponding to a display point on the HMD by a) defining a ray that originates from the eye coordinates, intersects the HMD and terminates at the object coordinates and b) calculating an intersection point of the ray and the HMD, the intersection point being the display point; and calculate calibration data based on the screen coordinates, the object coordinates and a transformation from a target coordinate system to the scene camera coordinate system.

10. The apparatus of claim 9, the at least one processor further configured to derive subsequent screen coordinates for the display of AR in relation to other real-world object points based on the calibration data.

11. The apparatus of claim 9, wherein the calibration data corresponds to a projection matrix (P).

12. The apparatus of claim 9, wherein the transformation from the target coordinate system to the scene camera coordinate system is provided by a model view matrix (M).

13. A non-transitory computer-readable medium storing computer executable code for calibrating an augmented reality (AR) device having an optical see-through head mounted display (HMD), comprising code for:

obtaining eye coordinates in an eye coordinate system corresponding to a location of an eye of a user of the AR device;

obtaining object coordinates in a world coordinate system corresponding to a location of a real-world object in the field of view of the AR device, as captured by a scene camera having a scene camera coordinate system;

calculating screen coordinates in a screen coordinate system corresponding to a display point on the HMD by a) defining a ray that originates from the eye coordinates, intersects the HMD and terminates at the object coordinates and b) calculating an intersection point of the ray and the HMD, the intersection point being the display point; and calculating calibration data based on the screen coordinates, the object coordinates and a transformation from a target coordinate system to the scene camera coordinate system.

* * * * *